Oct. 26, 1926.
F. W. MANNING
1,604,652
PROCESS OF AND APPARATUS FOR TREATING, DEWATERING, COMPRESSING, AND DRYING INDUSTRIAL WASTES, SEWAGE SOLIDS, ETC
Filed June 17, 1925     4 Sheets-Sheet 1
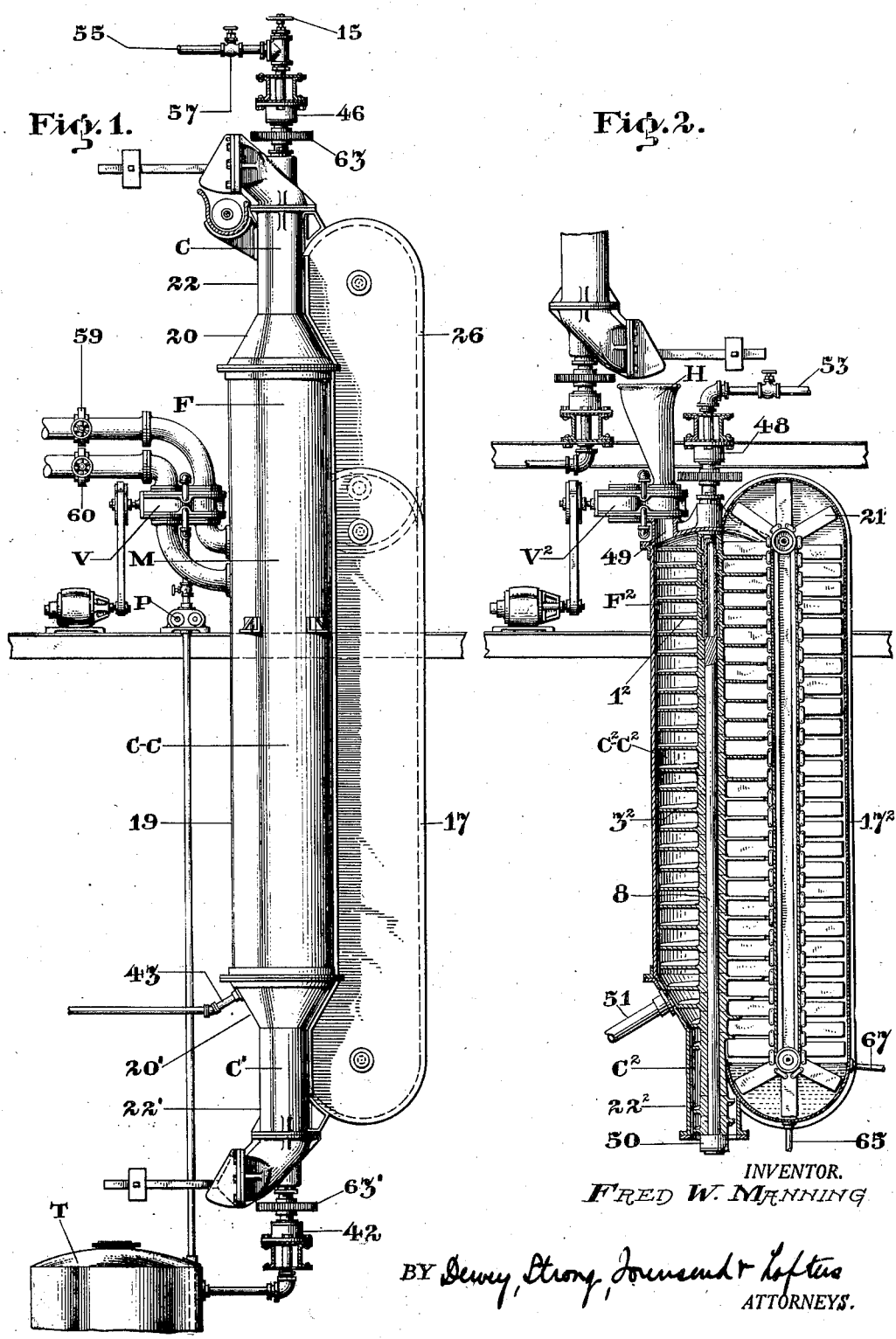
INVENTOR.
FRED W. MANNING
BY Dewey, Strong, Townsend & Loftus
ATTORNEYS.

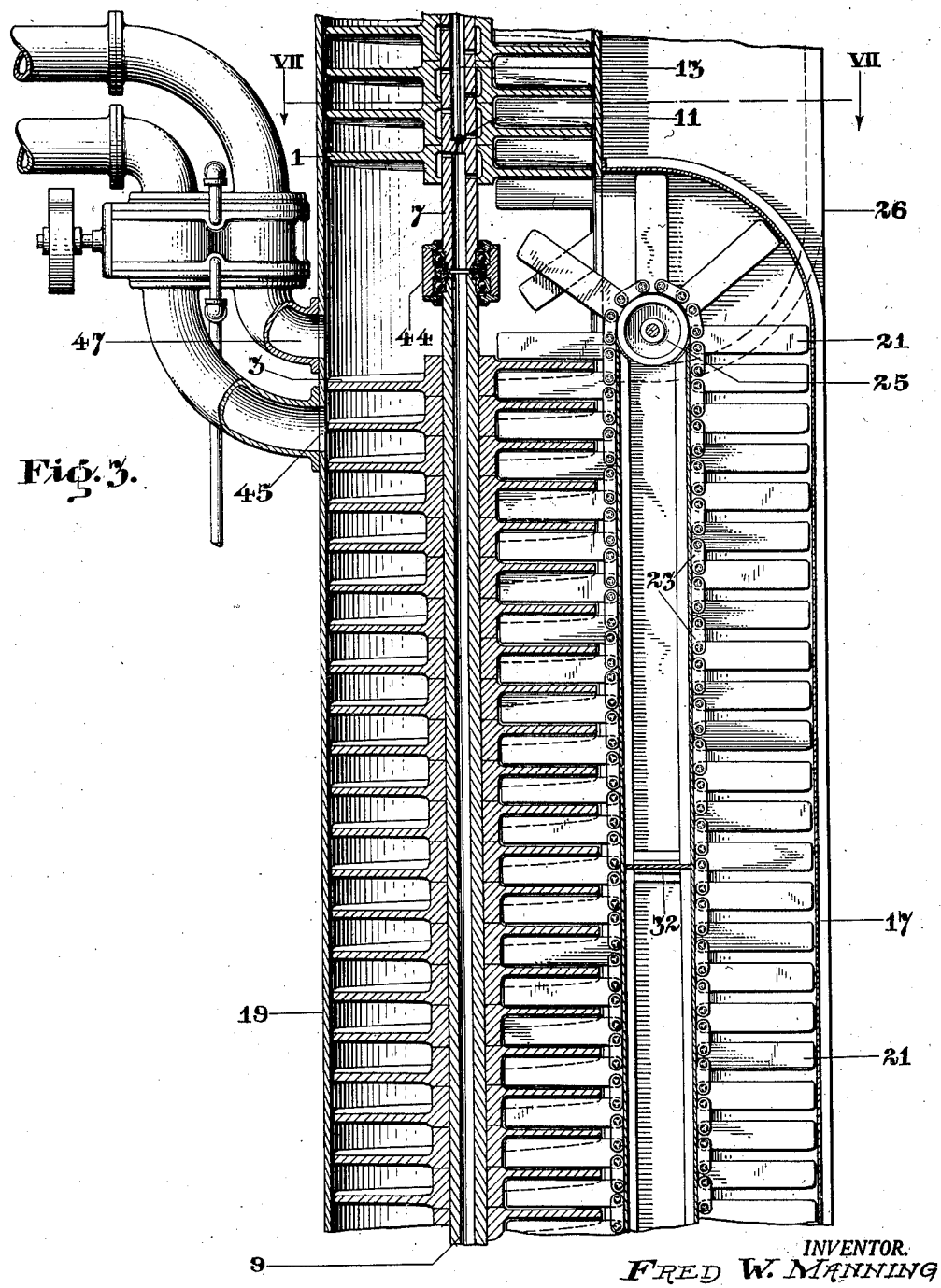

Oct. 26, 1926.　　　　　　　　　　　　　　　　1,604,652
F. W. MANNING
PROCESS OF AND APPARATUS FOR TREATING, DEWATERING, COMPRESSING, AND DRYING INDUSTRIAL WASTES, SEWAGE SOLIDS, ETC
Filed June 17, 1925　　　　4 Sheets-Sheet 3

INVENTOR.
FRED W. MANNING
BY Dewey, Strong, Townsend & Loftus
ATTORNEYS.

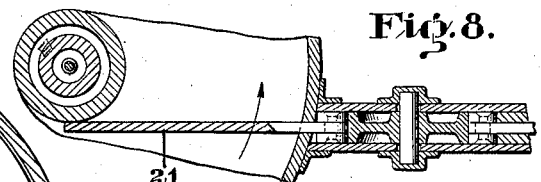
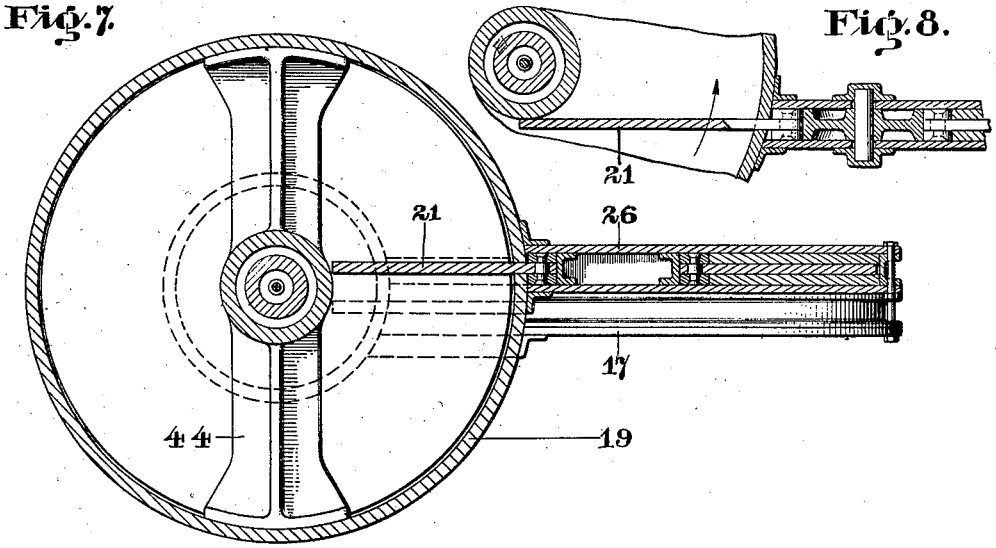
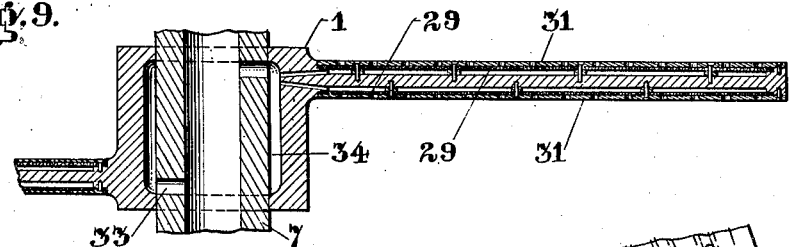
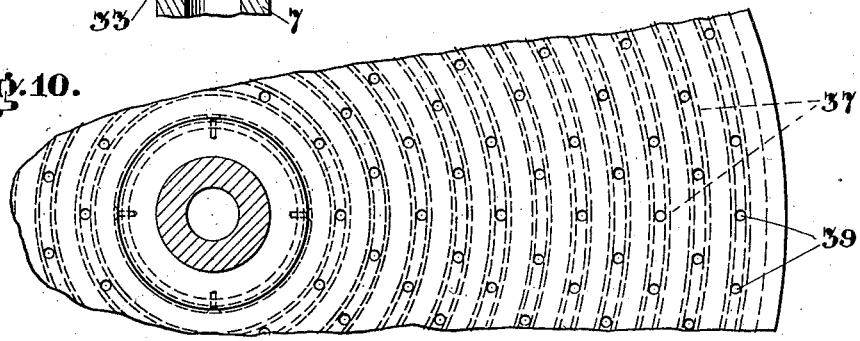
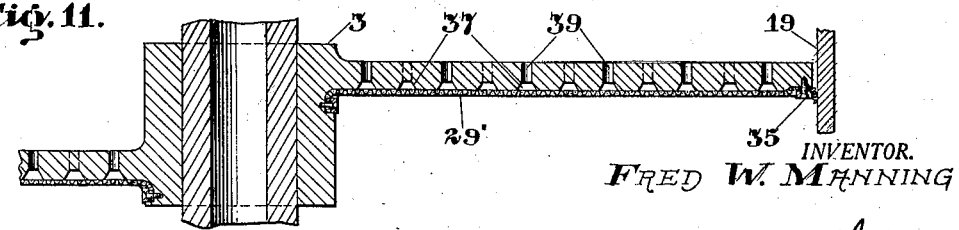

Patented Oct. 26, 1926.

1,604,652

UNITED STATES PATENT OFFICE.

FRED W. MANNING, OF BERKELEY, CALIFORNIA.

PROCESS OF AND APPARATUS FOR TREATING, DEWATERING, COMPRESSING, AND DRYING INDUSTRIAL WASTES, SEWAGE SOLIDS, ETC.

Application filed June 17, 1925. Serial No. 37,600.

This invention relates to certain new and useful improvements in methods of and apparatus for the treatment of fluids by solids or solids by fluids as the case may be but more particularly it relates to the treatment and separation of waste solids from their liquids, the dewatering of wet sludges, etc., and the compressing and drying of solids.

In my co-pending applications Serial Nos. 689,178, filed January 28, 1924; 747,431, filed November 3, 1924; and 20,155, filed April 2, 1925, I have described how heavy granular solids such as fuller's earth and bone char, etc., may be introduced into liquids such as oil, and sugar solutions, and separated therefrom. My present invention describes how liquids and sludges already containing finely dispersed solids or liquids which are difficult to filter and clarify, such as the colloidal and slimy materials contained in industrial wastes, by-products of sewage treatment plants, etc., may be treated, separated from their liquids, compressed and dried.

My co-pending application, Serial No. 96,343, filed March 20th, 1926, describes certain improved continuous methods whereby a granular treating agent such as fuller's earth, bone char, kieselguhr, etc., may be introduced in a dry powder state into a liquid under pressure and after one has been treated counter-currently by the other, the agent removed from the liquid and discharged from the apparatus in a similar dry powdery state, and these operations accomplished without any appreciable wear to the moving parts such as would be occasioned by the use of flushing valves and collection or compression chambers.

It has been the practice heretofore wherever continuous operating apparatus could be used, to accomplish the separating and pressing, of industrial wastes, sewage solids, etc., by means of continuous screw presses which exert heavy pressures but have very limited filtering areas, or by continuous suction filters which are usually not only limited as to filtering areas but also limited as to temperatures and very much limited as to pressures, and the drying is accomplished in a separate apparatus, usually rotary kilns. This arrangement requires an excessive amount of fuel and especially is this so where large amounts of sludge are to be heated before filtering, as the heating of activated sludge for dewatering by rotary suction filters which reduce the moisture content seldom as low as 80% after which rotary kilns further reduce the moisture content to approximately 10%. Even high pressures in the case of such material as activated sludge will not reduce the moisture content to any appreciable extent below 80% unless the filter cake solids are constantly turned over and over on the filter wall. The reason for this is probably because in many colloidal materials the very fine particles of liquid are completely surrounded with an agglomeration of very fine solid particles which, when subjected to high pressures, are simply jammed together affording no outlet for the liquid particles and to afford such outlet the fine particles of solids with entrained particles of liquid must be constantly agitated on the filter wall under a filtering differential pressure.

As is well known to those versed in the art, the greatest filtering rates for the great majority of purposes are obtained by filtering at high pressures either inwardly or outwardly through both sides of thin filtering walls spaced as closely together in a given apparatus as possible. Unfortunately no practical method, as far as I am aware, has ever been devised for doing this and removing the filter cake solids continuously.

It is therefore an object of my invention to obtain greatly increased capacities by combining the advantages of high filtering pressures and maximum filtering areas, and by means of scraper arms carried on an endless chain, coacting with flights of filter or counter current screws, continuously move the filtered solids forward into and through a compression chamber where the moisture content is lowered beyond that which is usually obtained, and then into a succeeding section of the same apparatus where the solids are reconditioned or dried by the passage of fluids through the solids in similar manner, and without loss of content values as, for example, nitrogen, where the solids are to be finally used as fertilizers.

It is a further object of my invention to treat a liquid or a sludge in one chamber by two different treating agents as by a coagulating or a decolorizing agent and a clarifying agent and to keep the clarifying agent separate from the sludge solids or liquid impurities and other treating agent during the treating and clarifying operations and finally to discharge them from the chamber separately so that the clarifying agent may be revivified and used over again.

It is a still further object of my invention to constantly agitate material of a colloidal nature while gathered on a filter wall and subjected to a differential filtering pressure.

In accordance with my invention I introduce a liquid or sludge to be treated and from which any contained solids or impurities are to be eliminated, into one end of the first section of an apparatus and force it toward the opposite end through the counter current flights of a screw as described in my co-pending application, Serial No. 747,431, through a middle chamber between the counter-current and filter chambers, where the treating or conditioning agents are introduced by means of a suitable feeding valve, and into a filter chamber where the liquid passes upward or forward and completely surrounds another screw, both sides of which are equipped with filter walls and through which the liquid passes as a perfectly clarified filtrate into and through and out of the hollow filter screw shaft, the elimination of the sludge solids or liquid impurities being gradual during the entire forward movement of the liquid or sludge through the counter current flights.

Treating solids such as lime, aluminum sulfate, etc., for the coagulation or flocculation of the colloidal matter or for other purposes and clarifying solids such as kieselguhr, asbestos, paper pulp, etc., for clarifying purposes, are fed into the chamber, the treating agent just below the last one or two counter current flights which prevents its movement into the middle chamber and which co-operating with the scraper arms on an endless chain moves the treating solids downward or forward in one direction while the sludge solids or liquid impurities build thereupon or are agitated with it and the liquid filters therethrough in its counter current movement until the solids finally pass through the compression chamber and are discharged into the next section of the apparatus. The clarifying agent entering the middle chamber is carried upward or forward in another direction by the movement of the liquid and completely surrounds and builds upon the walls of the filter flights, the greater portion building upon the first flight where the filter cake starts on its forward movement to a collection or compression chamber from which it is discharged in similar manner to the treating agent and sludge solids or liquid impurities at the opposite end of the section.

The counter current and filter screws may be of the same hand and rotate in opposite directions, or they may be of opposite hands and rotate in the same direction. The movements of the endless chains of scraper arms will be in the same direction as their respective screws and co-operating with their respective screws will prevent any rotation of the solids therewith, and will cause them to move steadily forward in the desired directions, the clarifying agent toward one exit and the treating agent with the sludge solids or liquid impurities toward the opposite exit. In this way the clarifying agent may be kept practically free from the sludge solids or liquid impurities and used simply for removing the finest colloidal matter bacteria, etc., and after being discharged may be revivified and used over again.

The solids from either end of the first section of the apparatus upon entering the second section are conveyed therethrough in similar manner by the co-action of a rotating screw and scraper arms on an endless chain and in counter direction to a reconditioning or drying fluid which enters under pressure at the opposite end of the section, and advancing through the counter current flights against the forward movement of the solids finally escapes through the filter flights carried on the upper end of the counter current shaft. The solids after being reconditioned, or dried or calcined as by a wash liquid, compressed air, saturated or superheated steam, heated furnace gases or other suitable fluids, pass through a collection or compression chamber of similar design to the solid exit of the previous section, or they may be passed out of the counter current chamber by means of a discharging valve of similar design to the feeding valve. The solids may then be passed into a third section of the apparatus of similar design to the second section for further reconditioning purposes.

Throughout this specification and the appended claims the term "treating solids" is intended to define any agent brought into contact by the described method with either liquid or gas for the purpose of flocculation or coagulation or for other purposes such as absorption, adsorption, revivification, diffusion, extraction, catalysis, precipitation of solids from liquids, water softening by means of exchange silicates, or for any solids used simply as a filter aid to speed up the rate of filtration and to keep the filter wall clean.

The features of the invention hereinbefore referred to in general terms will be better understood by reference to the following description taken in conjunction with the accompanying drawings, which illustrate a practical embodiment of the invention. It will be understood, however, that the construction herein illustrated and described is merely illustrative of how the features of the invention may be employed and that the invention is not limited as to structural features except as may be indicated by the terms employed in the claims appended hereto.

The invention will now be more specifically described by reference to the accompanying drawings wherein—

Fig. 1 is a side elevation of the first section of one form of apparatus for practicing my invention.

Fig. 2 is a sectional elevation of a second or a succeeding section.

Fig. 3 is an enlarged sectional elevation of the middle portion of the first section.

Fig. 7 is a horizontal sectional view taken on line 7—7 of Fig. 3.

Fig. 8 is a modified part view of Fig. 7 showing a method of supporting the scraper arms.

Fig. 9 is a sectional elevation of one of the filter flights.

Fig. 10 is a plan view of one of the counter current flights.

Fig. 11 is a sectional elevation of one of the counter current flights.

Fig. 1 illustrates the first section of the apparatus complete, comprising feeding valve V, filter chamber F, middle chamber M, counter current chamber C—C, top and bottom compression chambers C and $C^1$ respectively and pump P.

Figure 6:
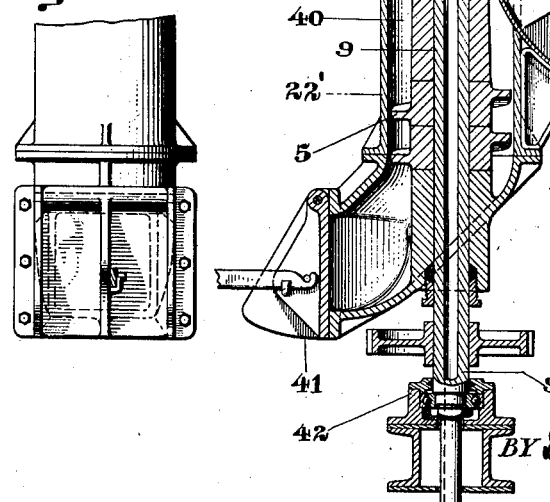
Fig. 6 is a front elevation of the discharging door shown in Fig. 4.

Fig. 2 illustrates the second or a succeeding section of the apparatus and how the solids from the lower end of the preceding section may be discharged into hopper H, and by means of feeding valve $v^2$ passed into filter chamber $F^2$, or the solids may be conveyed directly into the filter chamber from the compression chamber of the previous section as shown in Fig. 6 of my co-pending application Serial No. 747,431, and after passing through the filter chamber $F^2$ and counter current chamber $C^2$—$C^2$ pass out of collection or compression chamber $C^2$. If it is desirable to wash the solids before drying, this second section will ordinarily be a duplicate of the first section in which case the solids will be fed into the counter current chamber in the same manner as the treating solids in the first section. The section as shown in Fig. 2 differs mainly from the section shown in Fig. 1 in that the filter flights and counter current flights are mounted on one shaft and and are driven from above and the solids all move in one direction.

In the first section, the filter flights 1 are keyed to hollow shaft 7 driven from above, and the counter current flights 3 and 5 to hollow shaft 9 driven from below. Valve 11 is attached to valve stem 13 operated by hand wheel 15 and is for the purpose of allowing cloudy filtrate from the filter chamber to be discharged through the counter current shaft. A chamber 17 completely enclosed except on side adjacent to tank shell 19, serves as a guide for the return movement of the scraper arms 21 which movement is actuated by rotation of the counter current flights 3 and 5. These arms are connected into an endless chain by means of links 23 passing over pulleys 25 and 27. An upper guide chamber 26 encloses the chain of scraper arms for cooperating with the filter flights 1 and is slightly offset from the guide chamber 17 as shown in Fig. 7 so as to enable the scraper arms of each chain to clear each other in the middle chamber. Both guide chambers form pockets into the compression chambers C and $C^1$ as shown at 30 so as to prevent sludge from being squeezed into the guide chambers. Division wall 32 prevents any liquid in the guide chamber from short-circuiting to the middle chamber without passing through the counter current flights. Usually the scraper arms will be subjected to very little lateral pressure except in the compression chambers where the needed support is obtained by the compression chamber walls 22 and $22^1$. However, in cases where very heavy cake solids are being handled and support is required for the ends of the scraper arms, it can be obtained by projecting the arms until they find a bearing against the hubs of the flights as shown in Fig. 8, the arrow head showing the direction of rotation.

The filter flights 1 are slightly smaller in diameter than the inside diameter of the shell 19 so as to permit the flow of fluids around them and are equipped on both sides with filtering fabric 29 and covered with thin perforated wearing plates 31. The drainage spaces under the filter fabric are connected as shown with the hub annular chamber 34 which leads into hollow shaft 7 through openings 33. The counter current flights are only equipped on the under side with filtering fabric $29^1$, which may be graded so that the finer meshed fabrics are near the top and the coarser ones at the bottom. These filtering fabrics may or may not be protected with thin perforated wearing plates as in the case of the filter flights, but at any rate the filtering fabric should extend beyond the circumference of the flights and bear against the cylindrical wall 19 so that all the liquid will be compelled to pass through the flights. A narrow strip of braided wire tape clamped under the ring 35 and bearing against the wall as shown in Fig. 11 would serve the same purpose. Drainage channels 37 and small holes 39 permit the fluid to pass through the flights in a thoroughly dispersed and uniform movement.

Figure 4:
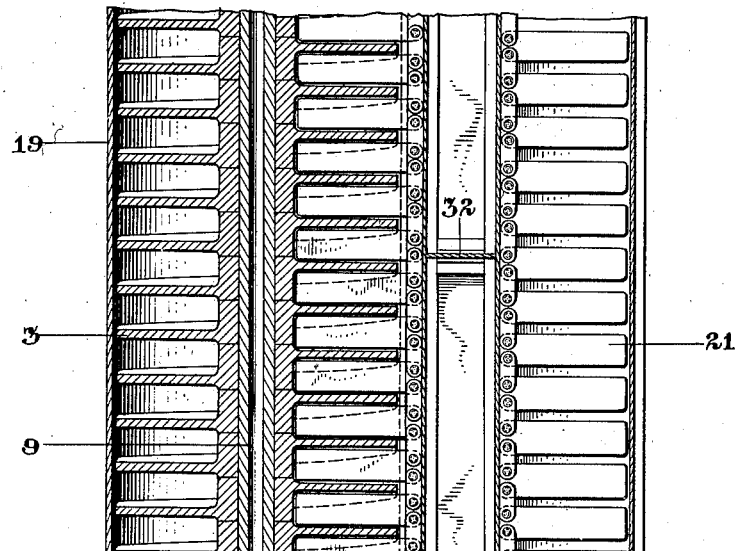
Fig. 4 is a sectional elevation of the lower end of the first section and is similar to the upper end of the same section but in a reversed position.
Figure 5:
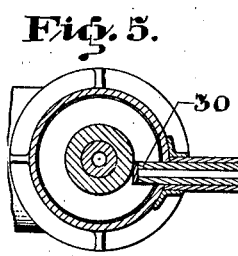
Fig. 5 is a horizontal sectional view taken on line 5—5 of Fig. 4.

The compression flights may also serve as counter current flights and be equipped in the same way. However, if very heavy pressure is required, the compression chamber may be equipped with a cylindrical cage of heavy filter bars in the well known way common to most continuous screw presses in which case the filtrate after passing through the filter bars, could be pumped back through feed inlet 43 or led to the run down tank T, the purpose of which is described later on. The annular space 40 in the compression chamber between two of the flights is always filled with a ring of solids which relieves the discharge door 41 of any considerable pressure. This ring of solids also prevents any liquid escape through the discharge door in cases where the regular forward movement of solids from within fail. The hubs of the compression screw flights 5 may be tapered as indicated in Fig. 4, so as to compress the solids just previous to their exit from the first section but this ordinarily would not be required during the discharge of the clarifying solids or in succeeding sections of the apparatus, in which cases these chambers will be considered simply as collection chambers. Bearings 42, 44 and 46 take the radial and end thrusts of the counter current and filter shafts in the first section and bearings 48 and 50 the radial and end thrusts of the shaft in the second section.

The operation of the apparatus thus constructed has been in part indicated in a foregoing description. Sludge to be dewatered and compressed or liquid from which impurities are to be removed, enters at 43, passes up through the counter current flights, the lower ones of which may be equipped with coarser screens or filtering fabric than those above, the last flight next the middle chamber being equipped with the finest of all. The finest mesh of these graded filtering fabrics naturally receives the lightest or least impervious filter cakes as the sludge solids or liquid impurities have been gradually eliminated by the time the liquid reaches the middle chamber and consequently, despite the fineness of the filtering mesh, as good a rate of flow is obtained as near the sludge inlet where the filtering mesh is much coarser. During the upward or forward movement, the liquid with solid contents comes in contact with coagulating or other treating solids moving downwards or in the opposite direction which enter from the feeding valve V, through entrance 45 situated one or two flights below the middle chamber. These treating solids are usually of granular form and ordinarily tend to increase the rates of filtration rather than retard it.

The liquid, on passing through the last counter current flight enters the middle chamber M comparatively free from all solids and is then mixed with a clarifying agent entering from feeding valve V through entrance 47. The liquid with clarifying agent freely passes upward or forward and surrounds the filter flights, but the greater portion of the entering solids gather upon the first flight where the cake begins to build resulting in a cloudy filtrate which is drained downwardly through the counter current shaft and discharged into rundown tank T from which it is withdrawn by pump P to flush the treating and clarifying solids thru the feeding valve into the chamber M, the clear filtrate resulting from the remainder of the filter flights being carried out through the hollow filter shaft 7 and discharged from pipe 55. The filter cake solids after forming on the filter walls of both sides of the first filter flight is moved along over the other filter flights and finally through the collection or compression chamber from which it is discharged to be revivified and used over again.

The sludge solids or liquid impurities with or without treating solids, on passing through and out of the compression chamber $C^1$ are discharged into a hopper H and through a feeding valve $V^2$ and entrance 49 into the second section of the apparatus. They are then advanced in a similar manner to that of the first section, first by the filter flights $1^2$ and then by the counter current flights $3^2$ in co-operation with an endless chain of scraper arms $21^2$ to be finally discharged through the collection or compression chamber $C^2$. When gases are passed in counter direction to the solids usually the counter current flights will be equipped with a filter wall on the gas advancing side instead of the solid advancing side of the flight which former side ordinarily will be the upper side. The constant agitation of the solids caused by their movement against the scraper arms, with the treating gases passing through the flights in a thoroughly dispersed condition and under pressure, will result in a rapid and uniform treatment of the solids and the continuous movement of the scraper arms through a water bath in the bottom of guide chamber $17^2$ will prevent their overheating when hot gases are used. A suitable inlet 65 and outlet 67 will maintain the cooling water at the level shown. Compressed air, saturated or superheated steam, hot furnace or other kinds of gases which may be oxidizing, neutral or reducing for drying, activating, revivifying or for other purposes, enter at 51 and leave the filter chamber $F^2$ through the filter flights, $1^2$ hollow end of shaft 8 and outlet 53. The clarifying solids, after being discharged from collection or compression chamber C of the first section, may also be treated in a similar manner.

The filter and counter current flights in the second section, being mounted on the same shaft must needs rotate at the same speed, but in the first section the filter flights will ordinarily rotate at a much slower speed thus causing the clarifying solids to move through the filter chamber very slowly. When desirable the rotation of the filter flights may be intermittent and the counter current flights continuous under which condition, during the coating of the filter flights with clarifying solids, the entire filtrate from the filter chamber will be cloudy and be discharged through counter current shaft to the run down tank T by the opening of valve 11 by hand wheel 15 and the closing of valve 57. After the coating has been accomplished and the filtrate has obtained the desired clarity, gate valve 59 controlling the discharge of the clarifying solids to the feeding valve V is closed and the filtrate is turned back to its normal course and discharge through filtrate outlet 55 by the opening of valve 57 and the closing of valve 11. At the end of the filtering period valve 57 is again closed and by means of mechanism, not shown, gear 63 is thrown into gear with its motive power and the clarifying solids are discharged, after which the rotation of the filter flights is stopped, gate valve 59 is opened and the coating of the filter flights is repeated. Or if desired the precoating may be removed only at long intervals of time by so arranging that additional clarifying solids are continuously introduced into the middle chamber and moved over the precoating until such precoating requires to be replaced which may then be accomplished in a few minutes by reversing the flow of the filtrate through the flights in conjunction with the rotation of the flights, in which case arrangements could be made to allow the incoming filtrate to escape through the first filter flight and the cloudy liquor outlet into tank T.

It will thus be seen that the present invention provides a new method and apparatus whereby waste solids, colloidal or finely dispersed material, solid or liquid, or impurities of any kind contained in a fluid, or any plastic material, may be gradually eliminated with the aid of suitable treating solids by means of counter current movements of the fluids and solids and that during the process of elimination, such materials may be kept almost entirely segregated from a clarifying agent introduced into the same chamber to retain the finely dispersed particles still contained in the liquid or fluid after passing through the last counter current flight.

It will also be seen that two solids may be continuously introduced for different purposes into a liquid or sludge in an enclosed chamber, and that one may be used to adsorb or coagulate the impurities in the liquid or otherwise treat the liquid countercurrently, and the other solid may be used to clarify the treated liquid, and that either or both solids may be used to precoat the filter walls of the apparatus. One filter wall of the apparatus illustrated is the solid advancing side of the counter current flights and the other filter walls are both sides of the filter flights, the solids or impurities contained in the liquid being allowed to build on top of either or both precoatings and at the same time that all the solids are advancing continuously at a predetermined rate toward their respective outlets, or one solid may be advancing continuously and the other intermittently toward their respective outlets. But whether the liquid or sludge solids build upon the treating and clarifying solids, or pass through them, or pass into and be retained by them, or are constantly agitated with them by the movement of the lights coacting with the scraper arms, depends upon the nature of the liquid or sludge, the amount of solid particles contained therein, the amount and purpose of the treating and clarifying agents introduced, and the pressure used.

It will also be evident that solids may be treated with gases or gases with solids, countercurrently and under pressure and at any predetermined rate of speed and that the invention is of more or less general application wherever solids, liquids, or gases are brought together for any purpose whatsoever and that variations may be made in the details of the process and apparatus without departing from the spirit of the invention.

The counter-current treatment of gases or vapors and solids, particularly the continuous counter-current catalytic treatment of cracked distillates in the vapor phase, is described in my co-pending application, Serial No. 128,900, filed August 12th, 1926.

Having thus described my invention what I claim and desire to secure by Letters Patent is—

1. A filtering process consisting of building filtered solids upon a spiral filter wall between such wall and the liquid to be filtered, passing the liquid through the filtered solids and filter wall, and moving the filtered solids along the wall.

2. A filtering process consisting of precoating a filter wall, filtering therethrough and building the filtered solids upon the precoating, and moving the filtered solids over the precoating.

3. A filtering process consisting of precoating a filter wall with clarifying solids and moving an additional clarifying or other treating agent over said precoating.

4. A treating and filtering process consisting of introducing a plurality of treating solids into a chamber containing a liquid, treating the liquid by passing certain of the solids through the liquid, and thereafter clarifying or otherwise further treating the liquid by passing the liquid through other of the said solids, whilst the first and second mentioned solids are moving through the said chamber in different directions.

5. The process of filtering sludge solids consisting of introducing the same into an enclosed chamber, moving the liquid in one direction through the chamber, moving the sludge solids in a counter direction, supplying clarifying solids to the resultant filtrate, and moving the clarifying solids through another portion of the chamber while filtering the liquid therethrough.

6. The process of treating and filtering sludge solids consisting of introducing the same into an enclosed chamber, supplying treating solids thereto, moving the liquid in one direction through the chamber, moving the treating and sludge solids in a counter direction, providing clarifying solids to the resultant filtrate in the chamber and moving the clarifying solids through another portion of the chamber while filtering the liquid therethrough.

7. The process of treating and filtering sludge solids consisting of introducing the same into an enclosed chamber, supplying treating solids thereto, moving the liquid in one direction through the chamber, moving the treating and sludge solids in a counter direction, providing clarifying solids to the resultant filtrate in the chamber adjacent the treating solids entrance thereof, and moving the clarifying solids through another portion of the chamber in a different direction to the movement of the treating solids while filtering the liquid therethrough.

8. A continuous process of treating and filtering sludge solids consisting of introducing the same into an enclosed chamber, supplying treating solids thereto, moving the liquid in one direction through the chamber, moving the treating and sludge solids in a counter direction collecting the solids to expel the liquid therefrom, moving the collected solids into and through a second chamber, and forcing drying gases through the solids in the second chamber counter to the movement of the solids.

9. A continuous treating and filtering apparatus comprising an enclosed chamber, means for supplying a sludge and clarifying solids to different portions of the chamber and means in the chamber for moving the sludge solids and clarifying solids in different directions therethrough and for separating the solids from the liquid.

10. A continuous treating and filtering apparatus comprising an enclosed chamber, means for supplying a sludge and clarifying solids to different portions of the chamber and means in the chamber for moving the sludge solids and clarifying solids in different directions therethrough and a second treating chamber in communication with first chamber and adapted to receive and treat the solids from the first chamber.

11. A continuous treating and filtering apparatus comprising an enclosed chamber, means for forcing a sludge into the chamber adjacent one end thereof, two sets of screw flights in different parts of the chamber adapted by their rotation to move solids toward their respective ends of the chamber and means adjacent to the conjunction of the two said sets for forcing treating solids into the chamber.

12. A continuous treating and filtering apparatus comprising an enclosed chamber, means for forcing a sludge into the chamber adjacent one end thereof, two sets of screw flights in different parts of the chamber adapted by their rotation to move solids toward their respective ends of the chamber and means adjacent to the conjunction of the two said sets for forcing treating solids into the chamber, the flights of one said screw set being perforated to permit the filtering of liquid therethrough and the other set having the flights thereof formed into a filter wall in communication with an axial draining duct in the screw shaft.

13. The combination of an enclosed chamber, a screw therein having a plurality of flights, a plurality of scrapers each adapted to engage the screw between two adjacent flights and a housing, said housing and chamber completely enclosing the scrapers and screw, the screw being adapted to rotate relatively to the scrapers.

14. The combination of an enclosed chamber, a screw therein having a plurality of flights, a plurality of scrapers mounted on an endless chain and each adapted to engage the screw between two adjacent flights and a housing, said housing and chamber completely enclosing the scrapers and screw, the screw being adapted to rotate relatively to the scrapers.

15. In an enclosed treating or filtering apparatus, a chamber containing a plurality of filter elements connected together as one continuous spiral, and an endless chain of scraper arms which coact with the said filter elements.

16. A filter screw comprising a center shaft, a filter spiral continuously connected thereto, and means providing a filter wall along a side of the spiral in communication with a duct extending axially through the shaft.

17. A filter screw comprising a center shaft, a continuous spiral connected thereto along the length of the spiral, and means providing a filter wall on a side of the spiral in communication with a duct extending axially through the shaft.

18. A filter screw comprising a center shaft, a filter spiral continuously connected thereto, and means providing filter walls on both sides of the spiral in communication with a duct extending axially through the shaft.

19. A filter screw comprising a center shaft, a continuous spiral connected thereto along the length of the spiral, and means providing filter walls on both sides of the spiral in communication with a duct extending axially through the shaft.

FRED W. MANNING.